United States Patent
Ju et al.

(10) Patent No.: US 9,239,934 B2
(45) Date of Patent: Jan. 19, 2016

(54) MOBILE COMPUTING SYSTEM FOR PROVIDING HIGH-SECURITY EXECUTION ENVIRONMENT

(71) Applicant: Electronics and Telecommunications Research Institute, Daejeon (KR)

(72) Inventors: Hong-Il Ju, Daejeon (KR); Yong-Sung Jeon, Daejeon (KR); Young-Sae Kim, Daejeon (KR); Seung-Yong Yoon, Daejeon (KR); Jeong-Nyeo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 358 days.

(21) Appl. No.: 13/846,780

(22) Filed: Mar. 18, 2013

(65) Prior Publication Data

US 2014/0082690 A1 Mar. 20, 2014

(30) Foreign Application Priority Data

Sep. 14, 2012 (KR) .......................... 10-2012-0102303

(51) Int. Cl.
*G06F 21/62* (2013.01)
*G06F 21/53* (2013.01)

(52) U.S. Cl.
CPC ............ *G06F 21/6218* (2013.01); *G06F 21/53* (2013.01); *G06F 2221/2105* (2013.01); *G06F 2221/2149* (2013.01)

(58) Field of Classification Search
CPC ................ G06F 21/6218; G06F 21/53; G06F 2221/2105; G06F 2221/2149
See application file for complete search history.

(56) References Cited

U.S. PATENT DOCUMENTS

| 8,132,003 | B2 * | 3/2012 | Durham | G06F 21/54 380/255 |
|---|---|---|---|---|
| 8,255,988 | B2 * | 8/2012 | Carpenter | G06F 21/575 710/5 |
| 8,347,380 | B1 * | 1/2013 | Satish | G06F 11/00 708/200 |
| 8,397,306 | B1 * | 3/2013 | Tormasov | G06F 21/00 713/164 |
| 8,694,781 | B1 * | 4/2014 | Griffin | G06F 9/45558 713/168 |
| 8,839,455 | B1 * | 9/2014 | Tormasov | G06F 21/53 713/164 |
| 8,948,823 | B2 * | 2/2015 | Choi | H04W 52/0254 455/574 |
| 2004/0003137 | A1 * | 1/2004 | Callender | G06F 21/53 719/328 |
| 2004/0153672 | A1 * | 8/2004 | Watt | G06F 9/3012 726/22 |
| 2004/0210796 | A1 * | 10/2004 | Largman | G06F 11/1417 714/20 |
| 2005/0138370 | A1 * | 6/2005 | Goud | G06F 21/57 713/164 |
| 2005/0223225 | A1 * | 10/2005 | Campbell | G06F 21/6281 713/166 |
| 2006/0123416 | A1 * | 6/2006 | Cibrario Bertolotti | G06F 9/45533 718/1 |
| 2007/0089111 | A1 * | 4/2007 | Robinson | G06F 21/53 718/1 |
| 2007/0150730 | A1 * | 6/2007 | Conti | G06F 21/52 713/166 |
| 2007/0192824 | A1 * | 8/2007 | Frank | H04L 9/32 726/1 |
| 2007/0226795 | A1 * | 9/2007 | Conti | G06F 21/74 726/22 |
| 2007/0271610 | A1 * | 11/2007 | Grobman | G06F 21/53 726/22 |

(Continued)

FOREIGN PATENT DOCUMENTS

KR 1020100057306 A 5/2010

*Primary Examiner* — Eleni Shiferaw
*Assistant Examiner* — Nelson Scott Giddins
(74) *Attorney, Agent, or Firm* — William Park & Associates Ltd.

(57) ABSTRACT

A mobile computing system for providing a high-security execution environment is provided. The mobile computing system separates execution environments in the same mobile device on the basis of virtualization technology and manages user-specific execution environments using the same hardware security module, thereby facilitating protection of personal privacy.

11 Claims, 3 Drawing Sheets

(56) References Cited

U.S. PATENT DOCUMENTS

| | | | |
|---|---|---|---|
| 2008/0104673 A1* | 5/2008 | O'Connor | G06F 21/53 726/4 |
| 2008/0163212 A1* | 7/2008 | Zimmer | G06F 9/4843 718/100 |
| 2009/0049220 A1* | 2/2009 | Conti | G06F 13/24 710/267 |
| 2009/0157936 A1* | 6/2009 | Goss | G06F 1/3203 710/264 |
| 2009/0249332 A1* | 10/2009 | Hoehle | G06F 9/45558 718/1 |
| 2009/0249435 A1* | 10/2009 | Madathilparambil George | G06F 21/57 726/1 |
| 2009/0288167 A1* | 11/2009 | Freericks | G06F 21/54 726/23 |
| 2009/0328225 A1* | 12/2009 | Chambers | G06F 21/10 726/26 |
| 2010/0064293 A1* | 3/2010 | Kang | G06F 9/5027 718/104 |
| 2010/0100706 A1* | 4/2010 | Inoue | G06F 9/5077 712/30 |
| 2010/0132015 A1* | 5/2010 | Lee | G06F 21/57 726/3 |
| 2010/0235881 A1* | 9/2010 | Liu | G06F 21/6218 726/3 |
| 2010/0325644 A1* | 12/2010 | van der Linden | G06F 9/4411 719/327 |
| 2011/0131420 A1* | 6/2011 | Ali | G06F 21/575 713/189 |
| 2012/0011506 A1* | 1/2012 | Iwamatsu | G06F 1/3215 718/1 |
| 2012/0291101 A1* | 11/2012 | Ahlstrom | G06F 21/57 726/4 |
| 2013/0067473 A1* | 3/2013 | Olson | G06F 9/445 718/100 |
| 2013/0145144 A1* | 6/2013 | Newell | G06F 3/0484 713/100 |
| 2013/0151846 A1* | 6/2013 | Baumann | H04L 9/3263 713/156 |
| 2013/0151848 A1* | 6/2013 | Baumann | H04L 9/3263 713/164 |
| 2013/0160013 A1* | 6/2013 | Pires | G06F 21/41 718/1 |
| 2013/0219177 A1* | 8/2013 | Lee | G06F 21/10 713/166 |
| 2014/0032920 A1* | 1/2014 | Gehrmann | G06F 21/57 713/176 |
| 2014/0082690 A1* | 3/2014 | Ju | G06F 21/53 726/1 |
| 2014/0109091 A1* | 4/2014 | Philipson | G06F 9/4445 718/1 |
| 2014/0325533 A1* | 10/2014 | Wu | G06F 9/4411 719/321 |

\* cited by examiner

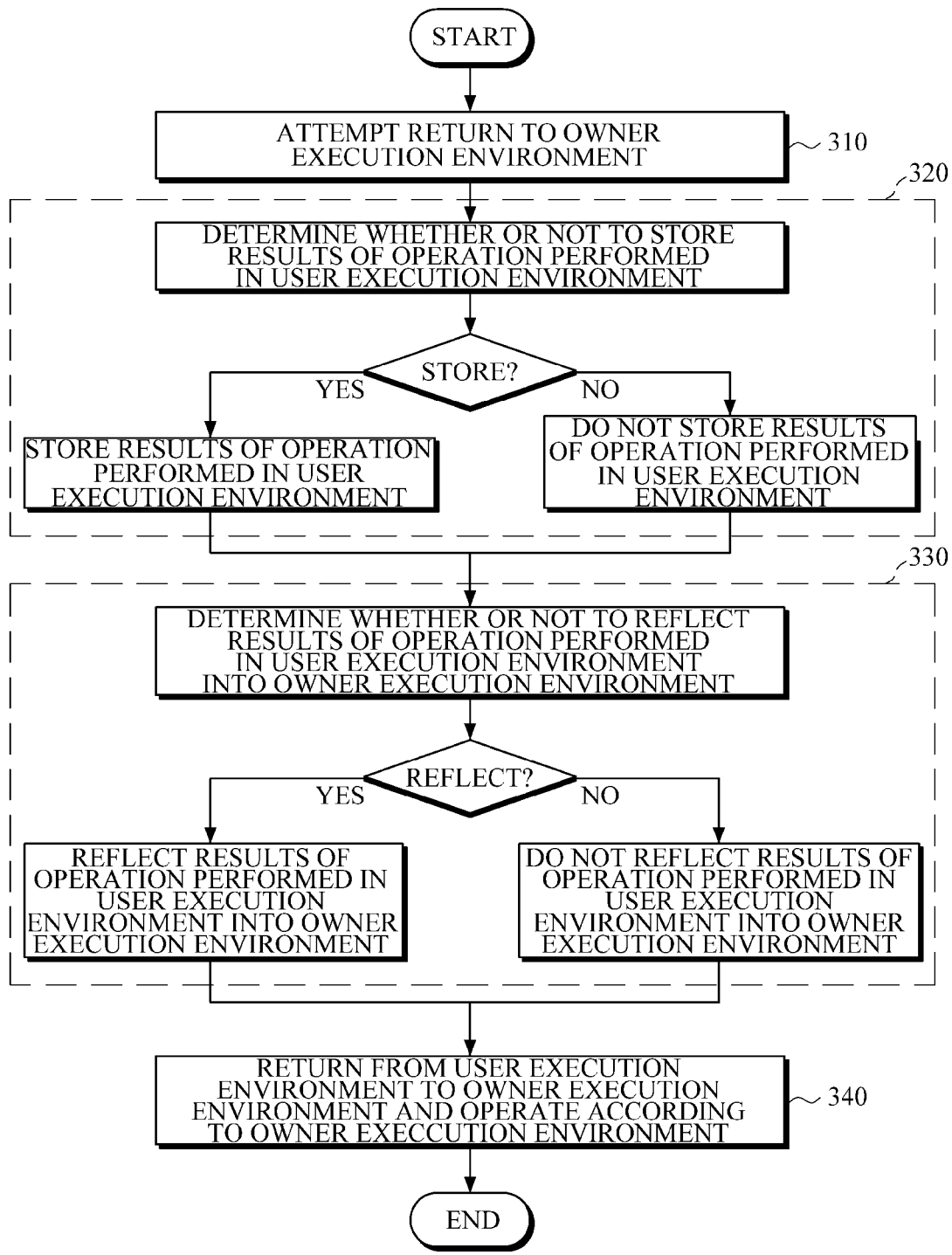

MOBILE COMPUTING SYSTEM FOR PROVIDING HIGH-SECURITY EXECUTION ENVIRONMENT

CROSS-REFERENCE TO RELATED APPLICATION

This application claims the benefit under 35 U.S.C. §119(a) of a Korean Patent Application No. 10-2012-0102303, filed on Sep. 14, 2012, the entire disclosure of which is incorporated herein by reference for all purposes.

BACKGROUND

1. Field

The following description relates to mobile computing technology, and more particularly, to a mobile computing system for providing a high-security execution environment.

2. Description of the Related Art

Mobile devices have been personally used by their owners, but the frequency of use of high-performance mobile devices including smart phones by third persons such as family members, friends, and colleagues other than the owners is also increasing recently.

For example, in a home, young children enjoy several types of entertainment such as games, photography, and music using smart phones of their parents, and thus the frequency of use of mobile devices by third persons is increasing.

Here, when a third person uses a mobile device and returns it to its owner, unexpected problems may occur and trouble the owner with a change in an execution environment, unlike when the owner lends the mobile device to the third person, as well as a change or partial deletion of a basic environment, a setting, etc. of the mobile device such as deletion of a phone number or a message.

In addition, when a third person uses a mobile device of an owner, the third person can know the owner's call history, message contents, messenger contents, current social network state, etc., and thus the problem of personal privacy exposure may exist. When a third person uses a mobile device out of malice, important data including personal information may leak out, and also greater damage including monetary damage may occur.

Thus, the present inventor has researched a technique for readily protecting personal privacy by separating execution environments in the same mobile device on the basis of virtualization technology and managing user-specific execution environments using the same hardware security module.

SUMMARY

The following description relates to a mobile computing system for providing a high-security execution environment capable of separating execution environments in the same mobile device on the basis of virtualization technology and managing user-specific execution environments using the same hardware security module.

In one general aspect, a mobile computing system for providing a high-security execution environment includes: one owner execution environment including an operating system (OS), a plurality of applications, and a hardware security module device driver; at least one user execution environment including an OS, a plurality of applications, and a hardware security module device driver; a hardware security module configured to perform hardware security functions including integrity check of the owner execution environment or the user execution environment, authentication of an owner or a user, storage of data including personal information, cryptographic operation for an application requiring security, and generation and storage of a cryptographic key; and a virtual hardware security module device driver configured to perform execution environment management including setting of the user execution environment and notify the hardware security module of whether the execution environment is the owner execution environment or the user execution environment.

According to an additional aspect of the present invention, when the owner execution environment is switched to the user execution environment or when the user execution environment is switched to the owner execution environment, the virtual hardware security module device driver may transfer an execution environment switch message to the hardware security module to notify the hardware security module of whether the execution environment is the owner execution environment or the user execution environment.

According to an additional aspect of the present invention, the virtual hardware security module device driver may define a unique signal indicating whether the execution environment is the owner execution environment or the user execution environment and transfer the defined unique signal to the hardware security module to notify the hardware security module of whether the execution environment is the owner execution environment or the user execution environment.

According to an additional aspect of the present invention, when the user execution environment is switched to the owner execution environment, the virtual hardware security module device driver may determine whether or not to store results of operation performed in the user execution environment.

According to an additional aspect of the present invention, when the user execution environment is switched to the owner execution environment, the virtual hardware security module device driver may determine whether or not to reflect results of operation performed in the user execution environment into the owner execution environment.

According to an additional aspect of the present invention, the virtual hardware security module device driver may provide a user interface for setting the user execution environment, receive a selection of at least one application or mobile device function to be performed in the user execution environment through the user interface, and set the user execution environment.

According to an additional aspect of the present invention, the hardware security module may have a non-volatile memory including a flag bit indicating whether the execution environment is the owner execution environment or the user execution environment and update a flag bit value indicating whether the execution environment is the owner execution environment or the user execution environment according to the notification of whether the execution environment is the owner execution environment or the user execution environment from the virtual hardware security module device driver.

According to an additional aspect of the present invention, the hardware security module may provide a separate security service for each of the owner execution environment and the user execution environment.

According to an additional aspect of the present invention, the virtual hardware security module device driver may set the user execution environment according to a security policy of the owner.

According to an additional aspect of the present invention, it may be impossible to access the owner execution environment in the user execution environment.

According to an additional aspect of the present invention, the OS of the owner execution environment and the OS of the user execution environment may be identical or different.

Other features and aspects will be apparent from the following detailed description, the drawings, and the claims.

BRIEF DESCRIPTION OF THE DRAWINGS

FIG. 3 is a flowchart illustrating a security operation of a mobile device mobile device in which a mobile computing system for providing a high-security execution environment according to an embodiment of the present invention is installed.

Figure 1:
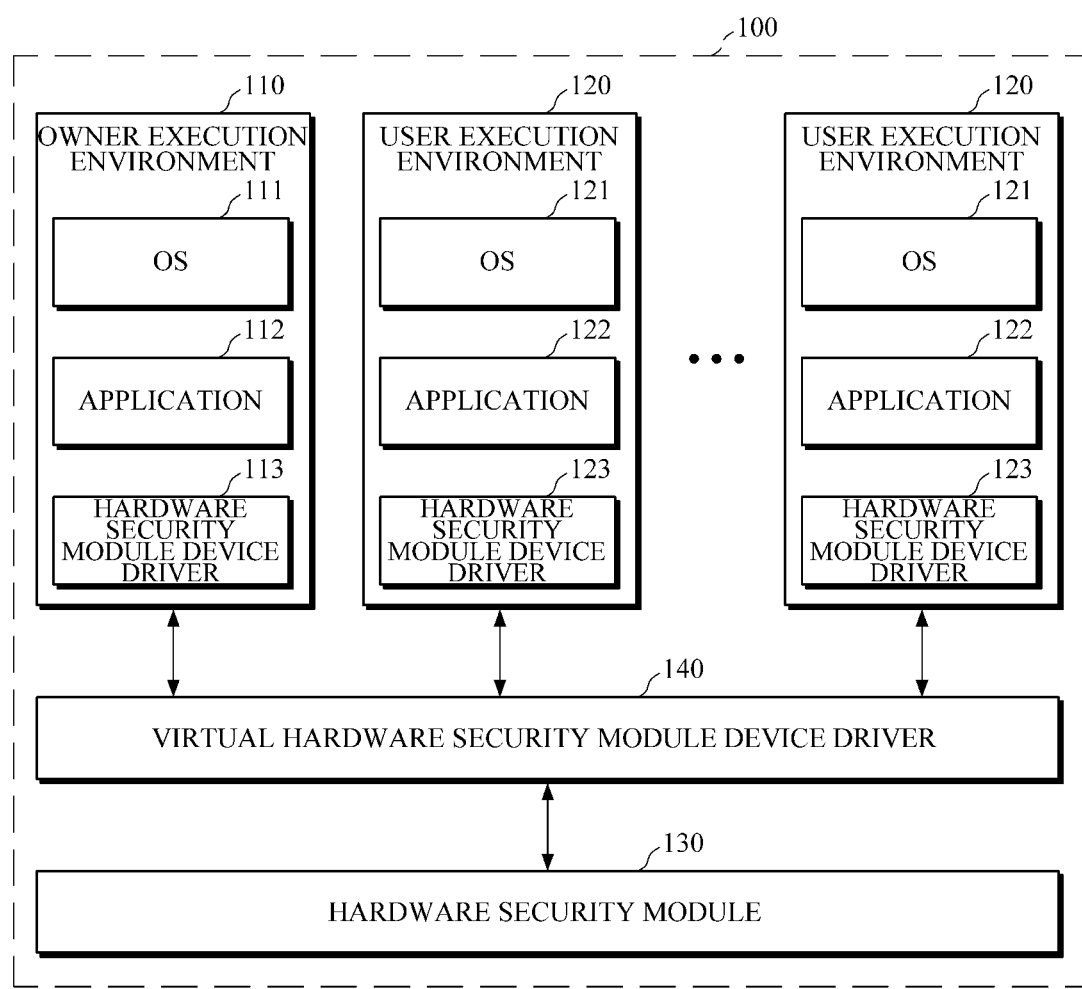
FIG. 1 is a block diagram of a mobile computing system for providing a high-security execution environment according to an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a block diagram of a mobile computing system for providing a high-security execution environment according to an embodiment of the present invention. As shown in FIG. 1, a mobile computing system 100 for providing a high-security execution environment according to this embodiment includes one owner execution environment 110, at least one user execution environment 120, a hardware security module 130, and a virtual hardware security module device driver 140.

The owner execution environment 110 includes an operating system (OS) 111, a plurality of applications 112, and a hardware security module device driver 113. An owner denotes an actual user who actually purchases and uses a mobile device mobile device, and the owner execution environment denotes an execution environment used by the owner.

The user execution environment 120 includes an OS 121, a plurality of applications 122, and a hardware security module device driver 123. Users denote third persons such as family members, friends, and colleagues who borrow the mobile device from the owner and use it. A user execution environment denotes an execution environment in which a user as a third person is permitted to use the mobile device by the owner of the mobile device or an execution environment in which the owner may temporarily use the mobile device.

Here, the OS 111 of the owner execution environment 110 and the OS 121 of the user execution environment 120 may be identical or different, the owner execution environment 110 cannot be accessed in the user execution environment 120, and only the owner of the mobile device has a right to set the user execution environment 120. The owner of the mobile device may set the user execution environment 120 to be the same as the execution environment 110 of the actual owner and provide the user execution environment 120 to a user, or may provide only a basic execution environment to the user.

Providing only a basic execution environment to a user means setting the user execution environment 120 so that the user as a third person can use only basic functions of the mobile device such as enabling the user to use only a telephone call service or disabling the user from using a calling function but enabling the user to use a receiving function only.

Meanwhile, the user execution environment 120 is useful when the owner temporarily uses the user execution environment 120 as an application test environment, such as a case in which the owner experimentally executes a new application or a specific application that has not been verified in the user execution environment 120 first without directly installing the application in the owner execution environment 110 and determines whether to apply the application to the owner execution environment 110 later.

Since an unverified application is highly likely to cause malfunction of the mobile device and may cause a critical error in the system, an unverified application, etc. are experimentally executed in the user execution environment 120 first so that system stability of the mobile device can be ensured.

The hardware security module 130 performs hardware security functions including integrity check of the owner execution environment 110 or the user execution environment 120, authentication of the owner or a user, storage of data including personal information, cryptographic operation for an application requiring security, and generation and storage of a cryptographic key.

The hardware security module 130 is implemented in hardware such as a central processing unit (CPU), a memory, and an input/output (I/O) device. For example, the hardware security module 130 may be a mobile trusted module (MTM) or a security element (SE) and may be implemented to provide a separate security service for the owner execution environment 110 or the user execution environment 120.

Before executing every application including booting of the mobile device, the hardware security module 130 first performs integrity check of an execution environment of the mobile device and the application and enables the application to be executed only when the integrity check is successful.

Meanwhile, the hardware security module 130 performs hardware security functions including authentication of the owner or a user, storage of data including personal information, cryptographic operation for an application requiring security, and generation and storage of a cryptographic key, thereby providing a security function for an application executed in the mobile device.

The virtual hardware security module device driver 140 can be implemented as a hypervisor, a virtual machine (VM), or the like, performs execution environment management including setting of the user execution environment 120, and notifies the hardware security module 130 of whether the execution environment is the owner execution environment 110 or the user execution environment 120.

For example, the virtual hardware security module device driver 140 may be implemented to notify the hardware security module 130 of whether the execution environment is the owner execution environment 110 or the user execution environment 120 by transferring an execution environment switch message to the hardware security module 130 when the owner execution environment 110 is switched to the user execution environment 120 or when the user execution environment 120 is switched to the owner execution environment 110.

For example, the virtual hardware security module device driver 140 may be implemented to define a unique signal indicating whether the execution environment is the owner execution environment 110 or the user execution environment 120 and notify the hardware security module 130 of whether the execution environment is the owner execution environment 110 or the user execution environment 120 by transferring the defined unique signal to the hardware security module 130.

At this time, the virtual hardware security module device driver 140 may be implemented to provide a user interface for setting the user execution environment 120 in the owner execution environment 110, receive owner's selection of at least one application or mobile device function to be performed in the user execution environment 120 through the user interface, and manually set the user execution environment 120.

In contrast, the virtual hardware security module device driver 140 may be implemented to automatically set the user execution environment 120 in the owner execution environment 110 according to a security policy of the owner. For example, the security policy of the owner may be information on a policy, such as a policy enabling a user who is a third person to use only a phone call service, set by the owner to set the user execution environment 120.

Switching from the owner execution environment 110 to the user execution environment 120 or returning from the user execution environment 120 to the owner execution environment 110 is performed by the virtual hardware security module device driver 140.

Here, switching from the owner execution environment 110 to the user execution environment 120 may be enabled by specific key manipulation or menu manipulation, while returning from the user execution environment 120 to the owner execution environment 110 may be enabled by only turning off a power and then turning on the power again so that a user is not able to switch from the user execution environment 120 to the owner execution environment 110 as he or she would like to and only the owner can access the owner execution environment 120.

When the owner execution environment 110 or the user execution environment 120 is determined as the execution environment of the mobile device by the virtual hardware security module device driver 140, the virtual hardware security module device driver 140 notifies the hardware security module 130 whether the execution environment is the owner execution environment 110 or the user execution environment 120, and connects the hardware security module device driver 113 of the determined owner execution environment 110 or the hardware security module device driver 123 of the user execution environment 120 with the hardware security module 130, thereby managing the mobile device to operate in the determined owner execution environment 110 or user execution environment 120.

The embodiment of the present invention implemented in this way separates an owner execution environment and a user execution environment in the same mobile device on the basis of virtualization technology, separately manages the owner execution environment and the user execution environment using the same hardware security module, and thereby can readily protect personal privacy.

Meanwhile, according to an additional aspect of the present invention, the virtual hardware security module device driver 140 may be implemented to determine whether or not to store results of operation performed in the user execution environment 120 when the user execution environment 120 is switched to the owner execution environment 110.

For example, the virtual hardware security module device driver 140 may be implemented to provide a user interface for determining whether or not to store results of operation performed in the user execution environment 120 when the user execution environment 120 is switched to the owner execution environment 110, and receive owner's selection of whether to store the results of operation performed in the user execution environment 120 or ignore the results without storing the results through the user interface.

Meanwhile, the virtual hardware security module device driver 140 may be implemented to determine whether or not to reflect results of operation performed in the user execution environment 120 into the owner execution environment 110 when the user execution environment 120 is switched to the owner execution environment 110.

For example, the virtual hardware security module device driver 140 may be implemented to provide a user interface for determining whether or not to reflect results of operation performed in the user execution environment 120 into the owner execution environment 110 when the user execution environment 120 is switched to the owner execution environment 110, and receive owner's selection of whether or not to reflect the results of operation performed into the user execution environment 120 in the owner execution environment 110 through the user interface.

This embodiment is useful when the owner temporarily uses the user execution environment 120 as an application test environment, such as a case in which the owner experimentally executes a new application or a specific application that has not been verified in the user execution environment 120 first without directly installing the application in the owner execution environment 110 and determines whether to apply the application to the owner execution environment 110 later.

Since an unverified application is highly likely to cause malfunction of the mobile device and may cause a critical error in the system, an unverified application, etc. are experimentally executed in the user execution environment 120 first so that system stability of the mobile device can be ensured.

In an additional aspect of the present invention, the hardware security module 130 may have a non-volatile memory including flag bits indicating whether the execution environment is the owner execution environment 110 or the user execution environment 120 and may be implemented to update a flag bit value indicating whether the execution environment is the owner execution environment 110 or the user execution environment 120 according to the notification of whether the execution environment is the owner execution environment 110 or the user execution environment 120 from the virtual hardware security module device driver 140.

Figure 2:
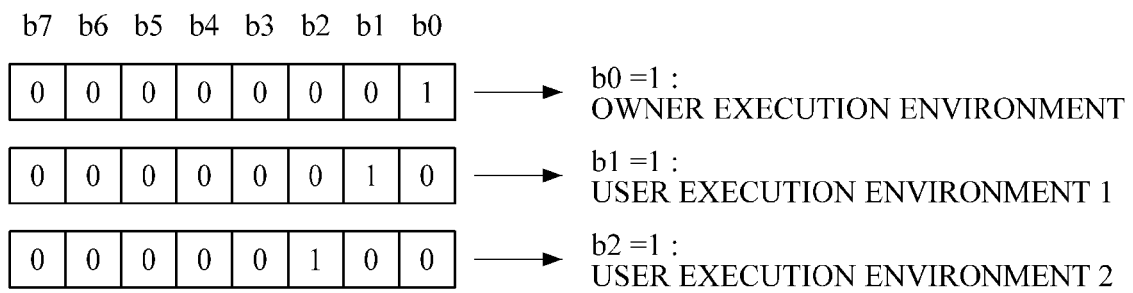
FIG. 2 is a diagram showing an example of flag bits indicating whether an execution environment is an owner execution environment or a user execution environment.

FIG. 2 is a diagram showing an example of flag bits indicating whether an execution environment is an owner execution environment or a user execution environment. Referring to FIG. 2, it is possible to see that eight bits (one byte) are assigned as flag bits indicating whether an execution environment is an owner execution environment or a user execution environment. Here, the flag bits may be adjusted according to the number of user execution environments.

When a value of a lowest bit b0 among the flag bits is "1," the flag bits indicate an owner execution environment and denote that a mobile device is currently operating in the owner execution environment. In this case, the hardware security module 130 operates according to the owner execution environment.

When a value of a second lowest bit b1 among the flag bits is "1," the flag bits indicate user execution environment 1 and denote that the mobile device is currently operating in user execution environment 1. In this case, the hardware security module 130 operates according to user execution environment 1.

When a value of a third lowest bit b2 among the flag bits is "1," the flag bits indicate user execution environment 2 and denote that the mobile device is currently operating in user execution environment 2. In this case, the hardware security module 130 operates according to user execution environment 2.

In this way, using the flag bits indicating whether an execution environment is the owner execution environment 110 or the user execution environment 120, it is determined whether a command transferred to the hardware security module 130 has been issued in the owner execution environment 110 or the user execution environment 120, and the hardware security module 130 operates according to the determination result so that security service for several execution environments can be provided through the same hardware security module in the same mobile device.

Security operation of a mobile device in which a mobile computing system for providing high-security execution environment according to an embodiment of the present invention as described above is installed will be described with reference to FIG. 3. FIG. 3 is a flowchart illustrating a security operation of a mobile device in which a mobile computing system for providing a high-security execution environment according to an embodiment of the present invention is installed.

First, it is assumed that a user execution environment is set by an owner, an owner execution environment is switched to the user execution environment by the owner, and a mobile device is currently operating in the user execution environment.

When a user who is a third person takes over the mobile device from the owner, uses it in the user execution environment, and then returns it to the owner, the owner attempts a return to the owner execution environment through the mobile device in operation 310.

Here, switching from the owner execution environment to the user execution environment may be enabled by specific key manipulation or menu manipulation, and returning from the user execution environment to the owner execution environment may be enabled by only turning off a power and then turning on the power again so that the user is not able to switch from the user execution environment to the owner execution environment as he or she would like to and only the owner can access the owner execution environment.

Then, in operation 320, the mobile device determines whether or not to store results of operation performed in the user execution environment, stores the results of operation performed in the user execution environment when it is determined to store the results of operation performed in the user execution environment, and does not store the results of operation performed in the user execution environment when it is determined not to store the results of operation performed in the user execution environment.

Next, in operation 330, the mobile device determines whether or not to reflect the results of operation performed in the user execution environment into the owner execution environment, reflects the results of operation performed in the user execution environment into the owner execution environment when it is determined to reflect the results of operation performed in the user execution environment into the owner execution environment, and does not reflect the results of operation performed in the user execution environment into the owner execution environment when it is determined not to reflect the results of operation performed in the user execution environment into the owner execution environment.

Next, in operation 340, the mobile device returns from the user execution environment to the owner execution environment and operates according to the owner execution environment. In this way, an embodiment of the present invention can readily protect personal privacy by separating an owner execution environment and a user execution environment in the same mobile device on the basis of virtualization technology and separately managing the owner execution environment and the user execution environment using the same hardware security module, thereby achieving the aforementioned purpose of the present invention.

An embodiment of the present invention readily protects personal privacy by separating execution environments in the same mobile device on the basis of virtualization technology and managing user-specific execution environments using the same hardware security module.

The present invention can be implemented as computer readable codes in a computer readable record medium. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mobile computing system for providing a high-security execution environment, comprising:
   one owner execution environment including an operating system (OS), a plurality of applications, and an owner hardware security module device driver;
   at least one user execution environment including an OS, a plurality of applications, and a user hardware security module device driver;
   a hardware security module configured to perform hardware security functions including integrity check of the owner execution environment or the user execution environment, authentication of an owner or a user, storage of data including personal information, cryptographic operation for an application requiring security, and generation and storage of a cryptographic key; and
   a virtual hardware security module device driver configured to perform execution environment management including setting of the user execution environment and notify the hardware security module of whether the execution environment is the owner execution environment or the user execution environment
   wherein the hardware security module comprises a byte of non-volatile memory including eight bits assigned as flag bits comprising a first flag bit indicating whether the execution environment is the owner execution environment and one or more other flag bits that respectively indicate one or more user execution environments according to the number of one or more user execution environments;

wherein the flag bits are used to determine whether a command transferred to the hardware security module has been issued in the owner execution environment or the one or more user execution environments, and the hardware security module operates according to the determination to perform the hardware security functions for the owner execution environment or the respective one or more user execution environments.

2. The mobile computing system of claim 1, wherein, when the owner execution environment is switched to the user execution environment or when the user execution environment is switched to the owner execution environment, the virtual hardware security module device driver transfers an execution environment switch message to the hardware security module to notify the hardware security module of whether the execution environment is the owner execution environment or the user execution environment.

3. The mobile computing system of claim 1, wherein the virtual hardware security module device driver defines a unique signal indicating whether the execution environment is the owner execution environment or the user execution environment and transfers the defined unique signal to the hardware security module to notify the hardware security module of whether the execution environment is the owner execution environment or the user execution environment.

4. The mobile computing system of claim 1, wherein, when the user execution environment is switched to the owner execution environment, the virtual hardware security module device driver determines whether or not to store results of operation performed in the user execution environment.

5. The mobile computing system of claim 1, wherein, when the user execution environment is switched to the owner execution environment, the virtual hardware security module device driver determines whether or not to reflect results of operation performed in the user execution environment into the owner execution environment.

6. The mobile computing system of claim 1, wherein the virtual hardware security module device driver provides a user interface for setting the user execution environment, receives owner's selection of at least one application or mobile device function to be performed in the user execution environment through the user interface, and sets the user execution environment.

7. The mobile computing system of claim 1, wherein the hardware security module updates a flag bit value indicating whether the execution environment is the owner execution environment or the user execution environment according to the notification of whether the execution environment is the owner execution environment or the user execution environment from the virtual hardware security module device driver.

8. The mobile computing system of claim 1, wherein the hardware security module provides a separate security service for each of the owner execution environment and the user execution environment.

9. The mobile computing system of claim 1, wherein the virtual hardware security module device driver sets the user execution environment according to a security policy of the owner.

10. The mobile computing system of claim 1, wherein it may be impossible to access the owner execution environment in the user execution environment.

11. The mobile computing system of claim 1, wherein the OS of the owner execution environment and the OS of the user execution environment are identical or different.

* * * * *